(12) United States Patent
Pietsch (10) Patent No.: US 12,311,577 B2
(45) Date of Patent: May 27, 2025

(54) METHOD AND APPARATUS FOR SIMULTANEOUSLY SLICING A MULTIPLICITY OF SLICES FROM A WORKPIECE

(71) Applicant: SILTRONIC AG, Munich (DE)

(72) Inventor: Georg Pietsch, Burghausen (DE)

(73) Assignee: Siltronic AG, Munich (DE)

( * ) Notice: Subject to any disclaimer, the term of this patent is extended or adjusted under 35 U.S.C. 154(b) by 338 days.

(21) Appl. No.: 18/017,156

(22) PCT Filed: Jul. 7, 2021

(86) PCT No.: PCT/EP2021/068883
§ 371 (c)(1),
(2) Date: Jan. 20, 2023

(87) PCT Pub. No.: WO2022/017803
PCT Pub. Date: Jan. 27, 2022

(65) Prior Publication Data
US 2023/0311363 A1    Oct. 5, 2023

(30) Foreign Application Priority Data
Jul. 21, 2020   (EP) .................................... 20186973

(51) Int. Cl.
*B28D 5/04* (2006.01)
*B28D 5/00* (2006.01)

(52) U.S. Cl.
CPC .......... *B28D 5/045* (2013.01); *B28D 5/0064* (2013.01)

(58) Field of Classification Search
CPC .............................. B28D 5/045; B28D 5/0064
See application file for complete search history.

(56) References Cited

U.S. PATENT DOCUMENTS

| 5,865,162 | A | 2/1999 | Kambe et al. |
| 9,333,673 | B2 * | 5/2016 | Pietsch ................. B28D 5/045 |

(Continued)

FOREIGN PATENT DOCUMENTS

| CN | 201225584 Y | 4/2009 |
| CN | 201516649 U | 6/2010 |

(Continued)

*Primary Examiner* — Omar Flores Sanchez
(74) *Attorney, Agent, or Firm* — BROOKS KUSHMAN P.C.

(57) ABSTRACT

A multiplicity of slices are simultaneously sliced from a workpiece during a slicing operation using a wire saw. A non-linear pitch function dTAR(WP) is selected dependent on a target thickness value function TTAR(WP), a pitch function dINI(WP) and a thickness value function TINI (WP), dTAR(WP) and adjacent grooves in the wire guide rollers are assigned a pitch at a position WP during the slicing operation, TINI(WP) slices which are obtained during a plurality of preceding slicing operations by means of the wire saw at the position WP are assigned a thickness value, dINI(WP), adjacent grooves in the wire guide rollers at the position WP are assigned a pitch during the preceding slicing operations, TTAR(WP) slices which are sliced off during the slicing operation at the position WP are assigned a target thickness value, WP denoting the axial position of the adjacent grooves with respect to the axes of the wire guide rollers.

11 Claims, 10 Drawing Sheets

(56) References Cited

U.S. PATENT DOCUMENTS

| | | | |
|---|---|---|---|
| 2006/0107940 A1* | 5/2006 | Ji | B24B 27/0633 125/21 |
| 2009/0090344 A1 | 4/2009 | Vaubourg | |
| 2014/0216222 A1 | 8/2014 | Itoi | |
| 2015/0083104 A1 | 3/2015 | Pietsch | |
| 2015/0202797 A1* | 7/2015 | Nakamoto | B28D 5/045 125/21 |
| 2015/0283727 A1* | 10/2015 | Reinhardt | B23D 57/0023 125/21 |
| 2016/0250776 A1* | 9/2016 | Kanbayashi | B24B 27/0633 125/21 |
| 2017/0361494 A1* | 12/2017 | Jeon | B28D 5/0076 |
| 2020/0016671 A1 | 1/2020 | Pietsch | |
| 2020/0016719 A1* | 1/2020 | Kanbayashi | B24B 55/02 |
| 2020/0316817 A1 | 10/2020 | Rieger et al. | |
| 2021/0362373 A1* | 11/2021 | Mizushima | B24B 27/0633 |
| 2022/0016802 A1* | 1/2022 | Kobayashi | B28D 5/007 |

FOREIGN PATENT DOCUMENTS

| | | |
|---|---|---|
| CN | 101879759 A | 11/2010 |
| DE | 10237247 A1 | 3/2004 |
| DE | 102010005718 A1 | 7/2011 |
| DE | 102013219468 A1 | 3/2015 |
| DE | 102016211883 A1 | 1/2018 |
| EP | 0803336 A2 | 10/1997 |
| JP | S6127655 U | 2/1986 |
| JP | 2002144211 A | 5/2002 |
| JP | 2007203393 A | 8/2007 |
| JP | 2020507484 A | 3/2020 |
| KR | 20040039011 A | 5/2004 |
| KR | 1020040039011 | 5/2004 |
| TW | 202015841 A | 5/2020 |
| WO | 2006067062 A1 | 6/2006 |
| WO | 2010000169 A1 | 1/2010 |

\* cited by examiner

METHOD AND APPARATUS FOR SIMULTANEOUSLY SLICING A MULTIPLICITY OF SLICES FROM A WORKPIECE

CROSS REFERENCE TO RELATED APPLICATIONS

This application is the U.S. National Phase of PCT Appln. No. PCT/EP2021/068883 filed Jul. 7, 2021, which claims priority to European Application No. 20186973.2 filed Jul. 21, 2020, the disclosures of which are incorporated in their entirety by reference herein.

BACKGROUND OF THE INVENTION

1. Field of the Invention

The invention relates to a method and to an apparatus for simultaneously slicing a multiplicity of slices from a workpiece by means of a wire saw and to a wire saw which is suitable for carrying out the method.

2. Description of the Related Art

Thin and in particular uniform slices of a specific material are required for many applications. One example of slices which are subject to particularly exacting requirements in terms of uniformity and plane-parallelism of the front and back side are slices composed of semiconductor material that are referred to as "wafers" and that are used as substrates for the fabrication of microelectronic components. So-called wire sawing, in the case of which a multiplicity of slices are simultaneously sliced from a workpiece, is particularly important for producing such slices, since it is particularly economical.

Such methods and apparatuses required therefor are known, for example from DE 10 2016 211 883 A1 or DE 10 2013 219 468 A1. In such methods, a wire is guided spirally around at least two wire guide rollers in such a way that two wire guide rollers stretch a web composed of wire sections extending parallel to each other, said web facing toward the workpiece. The wire guide rollers have the form of straight circular cylinders, which can be rotated about their axes and the lateral surfaces of which are provided with a multiplicity of annularly closed grooves which extend in planes perpendicular to the axes and which guide the wire. Rotation of the wire guide rollers produces a relative movement between the wire sections and the workpiece. A wire saw also has a feed apparatus, to which the workpiece is fastened via a saw beam (sacrificial beam) and which feeds the workpiece to the wire web. Relative movement in the presence of an abrasive brings about a removal of material from the workpiece upon contact of the workpiece and the wire web. In the case of continued feeding with relative movement and in the presence of abrasive, the wire sections form slicing gaps in the workpiece in a material-removing manner, and the wire web slowly works through the entire workpiece until the wire web comes to lie completely within the saw beam, to which the workpiece is connected by means of a glue joint. The workpiece is then separated completely into slices, which hang from the saw beam like teeth of a comb, held only by the glue joint.

Wire sawing may differ in accordance with wire lap slicing and wire grind slicing. Wire lap slicing is characterized by a three-body interaction between a wire, which initially bears no abrasives, the abrasive supplied loosely in a slurry, and the workpiece. Wire grind slicing is characterized by a two-body interaction between abrasives, which are incorporated firmly into the surface of the wire, and the workpiece.

The wire is usually composed of hypereutectoid pearlitic steel (piano wire). The steel wire is usually covered with a very thin layer of brass or zinc, the ductility of which serves as drawing aid (solid lubrication) during the production of the wire and which acts as corrosion protection for the finished wire. In wire lap slicing, the abrasive is usually composed of silicon carbide (SiC), which is suspended in a viscous carrier fluid composed of oil or glycol. In wire grind slicing, the abrasive is usually composed of diamond, which is fixed in the surface of the wire by means of electroplating or synthetic resin bonding or by form fit (pressing in, rolling in). The wire is supplied to the wire web from a stock, usually in the form of a spool. This spool is called a fresh wire spool. After passage through the wire web, the wire is supplied to a stock, likewise usually in the form of a spool. This spool is called a worn-wire spool.

In wire sawing, use is made of plain wire, and in wire lap slicing, use is additionally also made of so-called structured wire. Plain wire has the form of a circular cylinder of very great height, namely of the length of the wire, and the wire diameter corresponds to the diameter of the cylinder. Structured wire comprises a plain wire which is provided over its entire length with a multiplicity of protrusions and indentations in directions perpendicular to the wire longitudinal direction. The surface of a structured wire thus has protrusions and indentations, in which slurry can accumulate on the wire without being wiped off when the wire enters the slicing gap or during the further course of the wire through the slicing gap. Structured wire has a diameter of the underlying plain wire and an effective diameter which corresponds to the diameter of the circular cylinder with the smallest diameter that completely contains all of the indentations and protrusions (so-called envelope). WO 2006/067062 A1 describes one example of a structured wire.

A slice generally has the form of a cylinder of small height, and accordingly has a lower top surface (rear side), an upper top surface (front side) and a lateral surface (edge of the slice). The front and rear side of the slice form the main surfaces thereof, and the slice edge forms the secondary surface thereof.

That groove of the wire guide roller which is the first to come into contact with the fresh wire supplied to the wire web can be referred to as the first groove. That half of the wire web which contains the first groove is referred to as the fresh wire (supply) side of the wire web. The slice of which a main surface is produced by the wire section of the first groove can be referred to as the first slice, and that half of the workpiece which contains the first slice can be referred to as the start of the workpiece. The groove which is the last to come into contact with the worn wire taken off from the wire web can be referred to as the last groove. That side of the wire web which contains the last groove is referred to as the worn-wire (take-off) side of the wire web. The slice of which a main surface is produced by the wire section of the last groove can be referred to as the last slice, and that half of the workpiece which contains the last slice can be referred to as the end of the workpiece.

One problem in the case of wire sawing is that the thickness of the slices obtained by a slicing operation has a distribution of finite width. Typically, the further machining of the wire-sawn slices, for example by lapping, grinding, etching or polishing or a sequence of these steps, is subject to exacting requirements in terms of the thickness distribution of the wire-sawn slices. By way of example, no slice, or only a maximum proportion of slices determined by economical considerations, may fall below a minimum thickness in order to in each case keep ready the minimum material thickness above the target slice thickness required for the subsequent removal of material, in order to completely remove the surface layers which have been damaged by the wire sawing. At the same time, it is often the case that the wire-sawn slices must not exceed a defined maximum thickness for the subsequent machining, for example because an excessive subsequent removal of material is uneconomical. By way of example, the slices in a lapping operation, which is subsequent to the wire sawing and which, as a so-called batch process, simultaneously machines a multiplicity of slices, have to have starting thicknesses of very narrow distribution, because otherwise the load of the working disk is distributed non-uniformly to the individual slices and may overload the latter and cause them to break, or a misalignment of the working disk occurs, which leads to slices with a wedge-shaped thickness profile. By way of example, in a subsequent grinding machining process, a grinding wheel may also become clogged and blunt or, in the case of a plurality of grinding wheels (double-sided machining), there may be a non-uniform removal of material from the front and rear side of the slice if the amount of material removed in a grinding operation is too great. In addition to the minimum and maximum thickness mentioned by way of example, further thickness parameters are conceivable, with respect to which the wire-sawn slices must have a narrow distribution so that machining operations subsequent to the wire sawing can be performed in an economical manner and slices with the required high degree of uniformity and plane-parallelism of their front and rear sides are obtained, for example the average slice thickness.

The grooves of a wire guide roller generally have a V-shaped or U-shaped cross-sectional profile, which comprises a groove flank, a groove base and an indentation depth. The groove flank leads into the groove-free cylindrical lateral surface of the cylinder, the wire guide roller having the form of said cylinder, and has an opening angle which "catches" the wire and counteracts an inadvertent "jumping out" of the wire during rotation of the wire guide roller. The groove base is that part of the profile which is nearest to the wire guide roller axis and on which the wire, which is supplied with a defined tensile force to the wire guide roller, comes to lie owing to the tensile force. The indentation depth (groove depth) denotes the distance of that point of the groove which is nearest to the wire guide roller axis from the lateral surface of the wire guide roller. Rectilinear (pot-shaped), pointed (V-shaped) and curved (U-shaped) forms are known for the groove base.

It is known that, in wire lap slicing, the rolling of the loose abrasive between the wire and the workpiece, which brings about the brittle-erosive removal of material from the workpiece, also leads to undesired removal of material from the wire: the diameter of the plain wire or the effective diameter of the structured wire is reduced as a result of wear by abrasion. By contrast, in wire grind slicing, no movement takes place between the abrasive and the wire: the wire diameter changes only slightly in wire lap slicing, specifically only as a result of the very low abrasion of the diamond or as a result of individual diamonds occasionally breaking out of the bond with the wire surface.

It is further known that, owing to the wire becoming thinner as a result of abrasion, particularly in the case of wire lap slicing, a constant pitch of the grooves of the wire guide rollers leads to an increase in the thicknesses of the slices from the fresh wire side to the worn-wire side.

In the prior art, measures are known for counteracting non-uniform slice thickness caused in such a manner.

DE 10 2010 005 718 A1 describes a wire guide roller, in the case of which the radius of curvature of the U-shaped groove base, the opening angle of the groove flank or the groove depth of each groove is changed along the wire guide roller axis. A change of the groove pitch is also provided.

A number of patents describe cylindrical wire guide rollers having a pitch between the grooves which decreases continuously from the first to the last groove: CN 2015 166 49 U, KR 100 445 192 B, CN 2012 255 84 Y and CN 101 879 759 A.

However, none of the wire guide rollers known in the prior art solves the problem of widely distributed slice thicknesses after wire sawing.

The object of the present invention thus consists in specifying a method for providing slices which, with respect to a thickness parameter that is crucial for the subsequent machining, have a distribution that is sufficiently narrow for the requirements in terms of uniformity and plane-parallelism of the front and rear sides.

SUMMARY OF THE INVENTION

The objects of the invention are achieved by way of a method for simultaneously slicing a multiplicity of slices from a workpiece with a workpiece axis by means of a wire saw during a slicing operation, comprising moving a wire of the wire saw relative to the workpiece by way of rotation of wire guide rollers of the wire saw about their axes, the wire guide rollers having a casing which is provided with wire-guiding grooves, and stretching a wire web composed of wire sections of the wire; feeding the workpiece perpendicularly to the wire sections to the wire web in the presence of abrasives, the wire sections working completely through the workpiece, wherein a non-linear pitch function dTAR(WP) is selected in dependence on a target thickness characteristic value function TTAR(WP), a pitch function dINI(WP) and a thickness characteristic value function TINI(WP), dTAR(WP) assigning adjacent grooves in the casing of the wire guide rollers at a position WP a pitch during the slicing operation, TINI(WP) assigning slices which are obtained during a plurality of preceding slicing operations by means of the wire saw at the position WP a thickness characteristic value, measured on the slices, dINI(WP) assigning adjacent grooves in the casing of the wire guide rollers at the position WP a pitch during the preceding slicing operations, TTAR(WP) assigning slices which are sliced off during the slicing operation at the position WP a target thickness characteristic value, and WP denoting the axial position of the adjacent grooves with respect to the axes of the wire guide rollers.

DETAILED DESCRIPTION OF THE
PREFERRED EMBODIMENTS

The pitch dTAR(WP) is preferably selected such that the equation dTAR(WP)=dINI(WP)+TTAR(WP)−TINI(WP) is satisfied.

The method takes account of a thickness characteristic value of slices from a number i of preceding slicing operations by means of the wire saw, wire guide rollers with an initial distribution of the groove pitches that corresponds to the pitch function dINI(WP) being used. The second pitch function dINI(WP) is freely defined in advance and assigns, for the preceding slicing operations, adjacent grooves in the casing of the wire guide rollers a groove pitch which is dependent on the position WP of the adjacent grooves. The groove pitch also corresponds to the distance between the two wire sections in the wire web which run through the adjacent grooves. The position WP is preferably a discrete length specification, which indicates the axial position of adjacent grooves with respect to the axes of the wire guide rollers, and thus also a position of slices in the wire web.

The initial distribution in accordance with the pitch function dINI(WP) can for example be selected such that the pitches between adjacent grooves continuously decrease by identical amounts with the position WP. The method according to the invention furthermore comprises the specification of a target thickness characteristic value function TTAR (WP), which assigns a target thickness characteristic value to slices which are sliced off during the slicing operation at the position WP. Particularly suitable as target thickness characteristic value are the minimum thickness, the maximum thickness and the average thickness. The target thickness characteristic value complies in particular with the requirements in respect of the material removal of a subsequent machining step. The target thickness characteristic value can for example be a minimum thickness that each slice has to have so that there is a sufficient removal of material available to the for example subsequent grinding machining as subsequent machining step in order to completely remove the layers close to the surface which have been damaged by the wire sawing.

The thickness characteristic values can be based on full-area measurement. However, the measurement of the surface of the slice along the diameter thereof, in particular along the diameter thereof in a feed direction, is sufficient and preferred for determining the thickness characteristic values. A measurement along the diameter in the feed direction is also taken as a basis for the thickness characteristic values of the subsequently presented examples and of the comparative example.

From the number i of preceding slicing operations, there results for each position WP a corresponding number i of slices having thickness characteristic values TINI(WP). The thickness characteristic value function TINI(WP) assigns the slices which are obtained during the preceding slicing operations by means of the wire saw at the position WP a common thickness characteristic value, which is measured and calculated by mean value formation (arithmetic mean) or as a quantile. The minimum thickness of a slice is for example such a thickness characteristic value and corresponds to the value of the smallest distance between corresponding measurement points of the slice front side and slice rear side. The number of measurement points on a slice side is preferably at least 25. The measurement points preferably lie along the diameter in the feed direction. Instead of the mean value of the minimum thickness, it is for example also possible to use the mean value of the maximum thickness or the mean value of the average thickness of the slices at the position WP as thickness characteristic value, or the thickness of a quantile of the minimum thickness, of the maximum thickness or of the average thickness.

All of the slices are evaluated from the same position WP in the wire web with respect to the thickness characteristic value. A thickness characteristic value can for example be the (−3σ) quantile (=0.135 percentile). The (−3σ) quantile of the minimum thickness of the slices from preceding slicing operations means that 0.135% of all slices at the position WP fall below this minimum thickness.

By way of example, the target thickness characteristic value function TTAR(WP) can be prescribed in such a way that it assigns each position WP the same constant, TTAR (WP)=const., for example in that the (−3σ) quantile of the minimum thicknesses of the slices to be sliced off is intended to have the same value for all positions WP.

On the basis of the prescribed target thickness characteristic value function TTAR(WP) and the thickness characteristic value function TINI(WP) which results from measurements, the first pitch function dTAR(WP) is determined, which assigns each position WP a groove pitch between the two adjacent grooves with this position. The first pitch function dTAR(WP) is preferably obtained by means of the equation: dTAR(WP)=dINI(WP)+TTAR(WP)−TINI(WP).

The invention can be carried out with a plain wire, a plain wire having the form of a straight circular cylinder of very great height, namely of the length of the wire. The diameter of this circular cylinder denotes the diameter of the plain wire, and the axis of this circular cylinder denotes the wire longitudinal axis of the plain wire.

The invention is particularly preferably carried out by means of a wire lap slicing method using structured wire, a structured wire being a plain wire which is provided over its entire length with a multiplicity of indentations and protrusions in directions perpendicular to the wire axis. In the case of a structured wire, the wire longitudinal axis is the axis of the straight circular cylinder of smallest diameter that completely contains the structured wire (envelope), and the diameter of this circular cylinder is referred to as the effective diameter of the structured wire.

The invention can be carried out with a unidirectional wire run arrangement. In the case of unidirectional wire sawing, the wire is moved in exactly one direction of its longitudinal axis throughout the entire duration of the slicing operation. In this case, the rate of the wire feed can be variable.

The invention is particularly preferably carried out in a pilgrim step method. The pilgrim step method describes a movement of the wire in the form of a continuous sequence of pairs of directional reversals over the entire slicing operation, a pair of directional reversals comprising the moving of the wire in a first direction in a longitudinal direction of the wire by a first length and a subsequent moving of the wire in a second direction, exactly opposite to the first direction, by a second length, and the first length being selected to be greater than the second length. The pairs of directional reversals may be different in terms of the lengths and speeds of the wire movements.

By way of example, the first length may be 320 m and the second length 240 m. During a pair of directional reversals, 320 m+240 m=560 m of wire are thus moved through the slicing gap; however, within one such full pilgrim cycle the wire is further moved only by a total of 320 m−240 m=80 m from the stock of fresh wire to the stock of worn-wire. In the stated example, as a result of the wire sawing in the pilgrim step method, the wire is utilized with the factor (320+240)/(320−240)=560/80=5. This is advantageous because a very high wire consumption would result in the case of one-time wire usage (unidirectional slicing method) and the worn-wire would be worn only to a slight extent, which is very uneconomical. As a result of the selection of the first length L1 and the second length L2, a utilization ratio r=(L1+L2)/(L1−L2) is preferably selected such that the wire is worn to the extent that said wire, in the case of the selected tensile stress with which it is fed to or taken off from the wire web, still does not break and has not yet become so non-round (oval) as a result of non-uniform wear that the resulting slicing gap has width fluctuations which, in the planarity of the front and rear side of adjacent slices which bound the slicing gap, would lead to unevennesses and a lack of plane-parallelism that make the slices unsuitable for the claimed applications.

The axis of the workpiece is preferably oriented parallel to the axes of the wire guide rollers. It may however be advantageous to pivot the axis of the workpiece in relation to the direction of the axes of the wire guide rollers, for example if the workpiece is an ingot composed of monocrystalline semiconductor material and slices (wafers) having a determined crystallographic misorientation are desired. A misorientation is, for example, advantageous if, after wire sawing and subsequent machining (lapping, grinding, etching, polishing), the wafer is additionally provided with a layer composed of epitaxially applied further monocrystalline semiconductor material, since a misorientation is accompanied by an increased density of atomic steps at the growth boundary surface, which make a particularly defect-free growth of the epitaxial layer possible.

The method can also be implemented with wire guide rollers whose grooves have a depth corresponding to the depth function t(WP) in dependence on the position WP. This depth is preferably selected to be proportional to the reduction in the wire diameter (plain wire) or to the reduction in the effective diameter (structured wire) as a result of wire wear. The depth of the grooves is thus understood to mean the extent of the grooves in the direction toward the wire guide roller axis, that is to say the difference between the radius of the straight circular cylinder, the wire guide roller having the form of said cylinder, and the distance of the point of the groove profile, said point having the smallest distance from the wire guide roller axis, from the wire guide roller axis.

The object is additionally achieved by a wire saw for simultaneously slicing a multiplicity of slices from a workpiece, comprising wire guide rollers which stretch a wire web and have axes and casings, the casings being provided with a multiplicity of grooves that guide wire, the pitch between adjacent grooves at a position WP following a non-linear pitch function dTAR(WP) and WP denoting the axial position of the adjacent grooves with respect to the axes of the wire guide rollers.

The non-linear pitch function dTAR(WP) preferably satisfies the equation dTAR(WP)=dINI(WP)+TTAR(WP)−TINI(WP), TTAR(WP) being a target thickness characteristic value function which assigns a slice to be sliced off at the position WP a target thickness characteristic value, TINI(WP) being a thickness characteristic value function which assigns slices which have been obtained during a plurality of preceding slicing operations by means of the wire saw at the position WP a thickness characteristic value, measured on the slices, dINI(WP) being a pitch function which assigns adjacent grooves in the casing of the wire guide rollers at the position WP a pitch which was present during the preceding slicing operations.

Exemplary embodiments of the invention are described below also with reference to drawings.

LIST OF REFERENCE DESIGNATIONS AND ABBREVIATIONS USED

Figure 1:
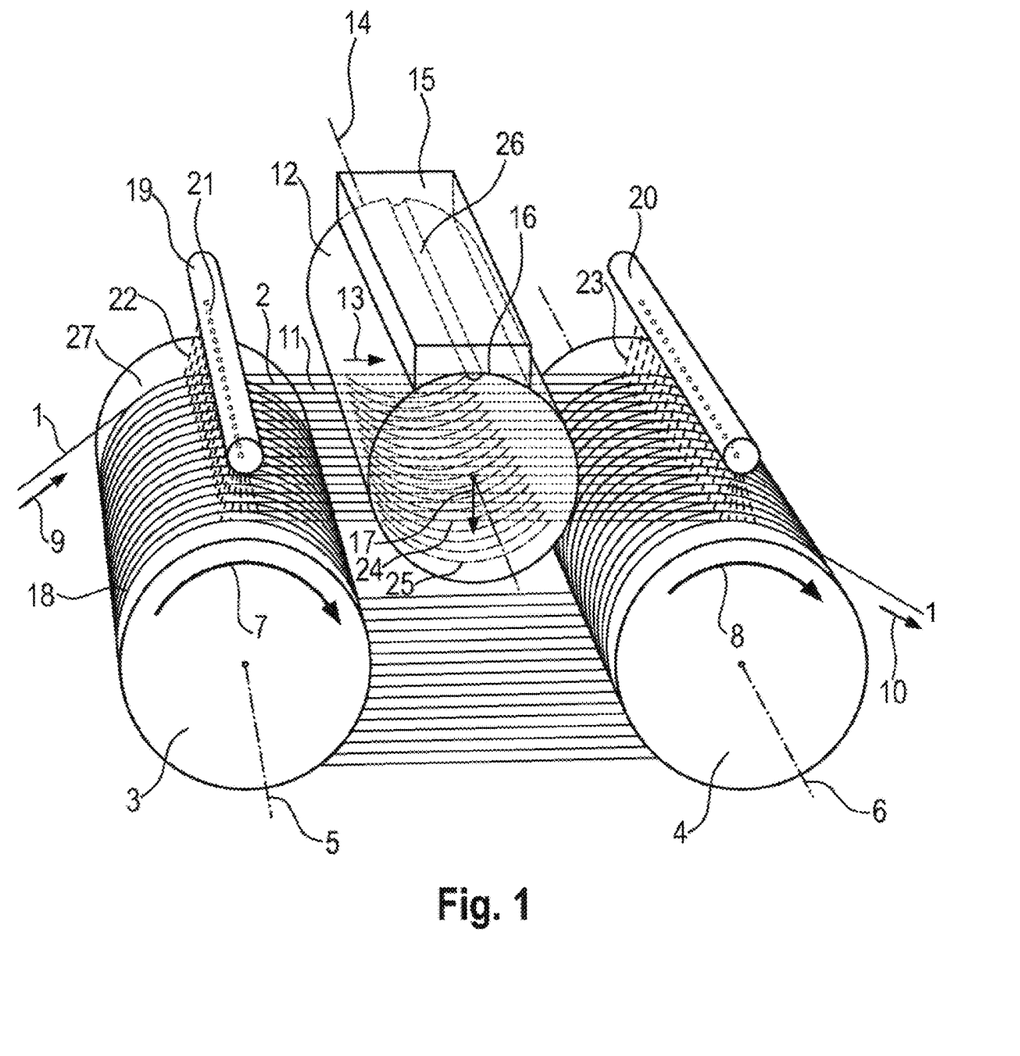
FIG. 1 shows elements of a wire saw.

1 Wire
2 Wire section
3 Left-hand wire guide roller
4 Right-hand wire guide roller
5 Axis of the left-hand wire guide roller
6 Axis of the right-hand wire guide roller
7 Rotation of the left-hand wire guide roller
8 Rotation of the right-hand wire guide roller
9 Wire feed (fresh wire)
10 Wire take-off (wornwire)
11 Wire web
12 Workpiece
13 Direction of movement of the wire sections
14 Axis of the workpiece
15 Saw beam
16 Glue joint
17 Feed direction
18 Groove
19 Left-hand nozzle
20 Right-hand nozzle
21 Outlet opening
22 Left-hand jet
23 Right-hand jet
24 Cutting depth
25 Slicing gap
26 Identification notch
27 Wire guide roller
28 Core of the wire guide roller
29 Covering of the wire guide roller
30 (−3σ) quantiles of the minimum thickness with linearly decreasing groove pitch against position WP
31 Regression curve with respect to 30
32 (−3σ) quantiles of the minimum thickness with non-linearly changing groove pitch against position WP
33 Regression curve with respect to 32
34 Linearly decreasing groove pitch
35 Groove pitch for constant (−3σ) quantile of the minimum thickness
36 Groove pitch for constant (+3σ) quantile of the maximum thickness 37 Cumulative frequency CF of the minimum thicknesses with linearly decreasing groove pitch
38 Cumulative frequency CF of the maximum thicknesses with linearly decreasing groove pitch
39 Cumulative frequency CF of the minimum thicknesses with non-linearly changing groove pitch optimized for constant (−3σ) quantiles of the minimum thickness
40 Cumulative frequency CF of the maximum thicknesses with non-linearly changing groove pitch optimized for constant (−3σ) quantiles of the minimum thickness
41 Cumulative frequency CF of the minimum thicknesses with non-linearly changing groove pitch optimized for constant (+3σ) quantiles of the maximum thickness
42 Cumulative frequency CF of the maximum thicknesses with non-linearly changing groove pitch optimized for constant (+3σ) quantiles of the maximum thickness
43 (+3σ) quantiles of the maximum thickness TMAX against the position WP with linearly decreasing groove pitch
44 Regression curve with respect to 43
45 (+3σ) quantiles of the maximum thickness TMAX against the position WP with non-linear groove pitch optimized for constant (−3σ) quantiles of the minimum thickness
46 Regression curve with respect to 45
47 (+3σ) quantiles of the minimum thickness TMIN against the position WP with non-linear groove pitch optimized for constant (+3σ) quantiles of the maximum thickness
48 Regression curve with respect to 47
49 (+3σ) quantiles of the maximum slicing gap width KMAX with linearly decreasing groove pitch for structured wire
50 Regression curve with respect to 49
51 (+3σ) quantiles of the maximum slicing gap width KMAX with linearly decreasing groove pitch for plain wire
52 Regression curve with respect to 51
53 Section with monotonous decrease
54 Section with monotonous increase
55 Section with monotonous decrease
56 Incision wedge
57 Saddle
58 Scanning direction in feed direction
59 Central plane of the slice
60 Slice
61 (+3σ) quantiles of the maximum thickness TMAX against the position WP with non-linear groove pitch, optimized for constant (+3σ) quantiles of the maximum thicknesses
62 Regression curve with respect to 61
α Opening angle
CF Cumulative frequency
d Groove pitch
d1 Pitch between the second and first grooves
dINI(WP) Pitch function
dTAR(WP) Non-linear pitch function
D Diameter of the wire guide roller
DIFF Difference
i Cut counter
KMAX Maximum width of the slicing gaps
L Length of the wire guide roller
r Radius of curvature of the groove base
s Width of the cylindrical part between adjacent grooves
s1 Width of the cylindrical part between the first and second grooves
s(WP) Width function
t Depth of the groove
t(WP) Depth function
t1 Depth of the first groove
TMIN Minimum thickness of a slice
TMAX Maximum thickness of a slice
TINI(WP) Thickness characteristic value function
TTAR(WP) Target thickness characteristic value function
VAR Variance
WGRP Groove pitches of the wire guide rollers
WP Position of the groove pitch of two adjacent grooves on the wire guide roller or slice position FIG. 1 shows the elements of a wire saw, which contribute to the understanding of the invention: wire 1 is fed from a stock (fresh wire spool, not shown) in a direction 9 and guided spirally in grooves 18 around at least two wire guide rollers 27, a wire web 11 composed of wire sections 2 extending parallel to each other being produced. The example of a wire saw in FIG. 1 shows two wire guide rollers 27, namely a left-hand wire guide roller 3 and a right-hand wire guide roller 4. As a result of rotation of the wire guide rollers 3 and 4 about their axes 5 and 6 in rotational directions 7 and 8, the wire sections 2 and the wire web 11 are moved in relative fashion in a direction 13 relative to the workpiece 12. The axes 5 and 6 of the wire guide rollers 3 and 4 are oriented parallel to each other. The workpiece 12 has an axis 14 and is connected to a saw beam 15 by way of a glue joint 16. The saw beam is fastened to a feed apparatus (not shown) which feeds the workpiece 12 in a direction 17 in perpendicular fashion to the wire web 11. Preferably, the workpiece 12 is an ingot composed of monocrystalline semiconductor material, for example composed of monocrystalline silicon. In this case, the workpiece has a straight circular-cylindrical form and is provided, parallel to its axis 14, with an identification notch 26 for the orientation of the crystal. On both sides of the workpiece 12, the wire web 11 is supplied, by nozzles 19 and 20, with jets 22 and 23 of liquid cutting aid via openings 21 in the nozzles. If the wire saw is operated in the grind slicing method, the cutting aid is a cooling lubricant containing no abrasively acting substances and the wire 1 is a piano wire whose surface contains firmly incorporated grains of diamond which have an abrasive action. If the wire saw is operated in the lap slicing method, the cutting aid is a slurry of silicon carbide (SiC) in a liquid carrier composed of oil or glycol.

As a result of feeding in the direction 17, the wire web 11 comes into contact with the workpiece 12. As a result of the relative movement 13 between the wire web 11 and the workpiece 12, the wire sections 2, in the presence of the abrasively acting substances, bring about a removal of material from the workpiece 12. In the case of further feeding 9 with relative movement 13, the removal of material brought about by the wire sections 2 forms slicing gaps 25 in the workpiece 12. The depth in the workpiece 12, up to which the wire sections have worked through the workpiece, is referred to as the cutting depth 24. When the cutting depth 24 exceeds the diameter of the workpiece, all of the wire sections 2 of the wire web 11 have sliced through the workpiece and have arrived in the holding beam 15: the workpiece has been completely separated into a multiplicity of slices. After passage through the wire web, the wire 1 exits the wire web 11 in a direction 10 to a stock of used wire (worn-wire spool, not shown).

Figure 2:
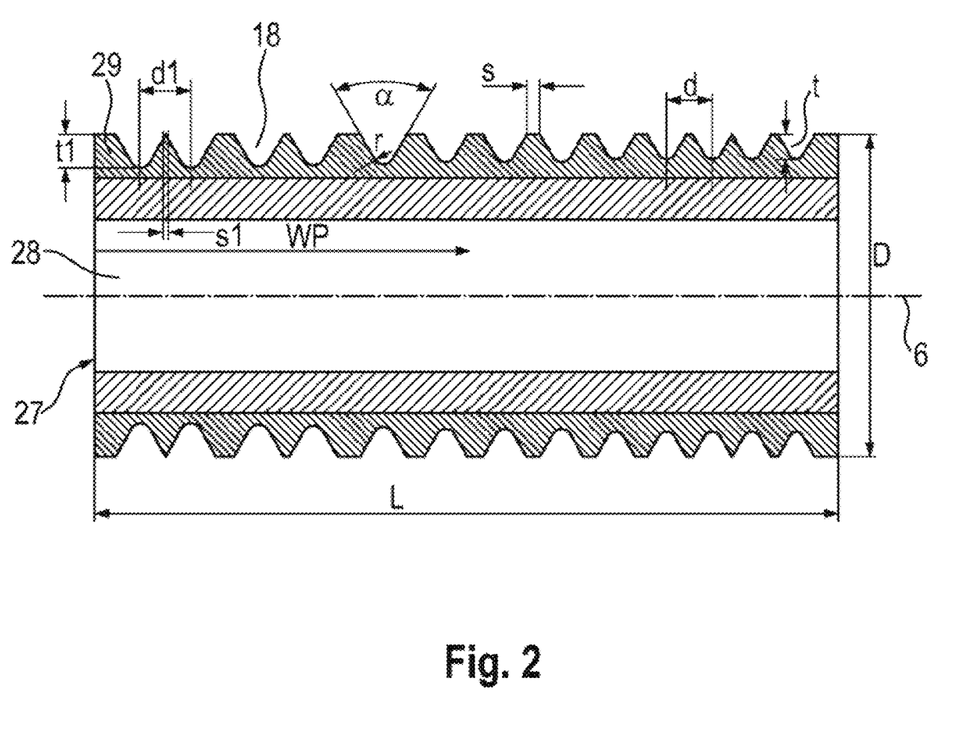
FIG. 2 shows a wire guide roller in cross section.

FIG. 2 shows a wire guide roller 27 having a diameter D and a length L in a section plane which contains the axis 6, comprising a core 28, which can for example contain a chamber for cooling the wire guide roller, and a casing 29.

The casing 29 consists of a coating composed of a wear-resistant material, for example composed of thermoset polyurethane. The coating is provided with annularly closed grooves 18 which are arranged in planes perpendicular to the axis 6 and which run around the wire guide roller. According to the invention, the pitch of adjacent grooves, in dependence on their position WP, measured along the axis 6 from the first groove with the depth t1 up to the last groove, is selected such that said pitch follows the non-linear pitch function dTAR(WP). The non-linear pitch function dTAR (WP) is dependent on thickness characteristic values of slices of preceding slicing operations, on the pitch function of the groove pitches during the preceding slicing operations and on the prescribed target thickness characteristic value function TTAR(WP). As shown by the different pitches for example of the first groove pitch d1 and of an arbitrary groove pitch d, dTAR(WP) changes in a non-linear manner. The grooves have an opening angle α of their groove flanks and a radius of curvature r of their groove bases. Furthermore, according to one embodiment of the invention, the groove depth t can vary with the position WP in accordance with the depth function t(WP), as shown by the depth t1, shown in exemplary fashion, of the first groove and of an arbitrary groove t. In dependence on the groove pitch dTAR(WP) which is variable with the position WP and optionally on the variable groove depth t(WP), with identical radius of curvature r of the groove bases and opening angle α of the groove flanks, the remaining cylindrical regions of the lateral surface between the grooves have different widths in accordance with the width function s(WP). The width s1 shows, in exemplary fashion, the cylindrical portion between the first and second grooves.

Figure 10:
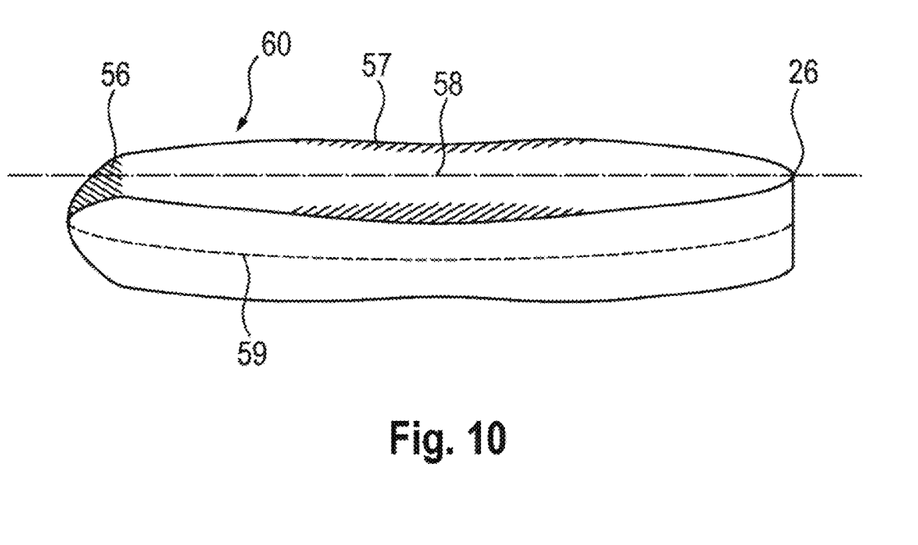
FIG. 10 shows characteristic thickness features of a lap-sliced semiconductor slice.

FIG. 10 shows a schematic sketch of a semiconductor slice 60 obtained by way of wire lap slicing in a thickness illustration, that is to say with a planar central area 59 between the front and rear sides of the semiconductor slice, in a perspective illustration. Any undulations of the slice, which would manifest in a curvature of the central area 59, have been eliminated in this thickness illustration. The central area contains exactly the points halfway between the paths which connect respectively corresponding points on the front side and the rear side. Corresponding points are in each case those whose connecting paths are perpendicular to the central area. A semiconductor slice 60 obtained by means of wire lap slicing typically has, in a thickness illustration, a cut-in wedge 56, a zone of reduced slice thickness in the region of first contact between the workpiece and the wire web. The cut, that is to say the feeding of the workpiece during the slicing operation, runs along the scan line 58 from left to right in FIG. 10. The wire moves perpendicularly to the feed direction, that is to say perpendicularly to the scan line 58. The thickness characteristic value is preferably measured parallel to the scan line 58.

The cut-in wedge 56 is produced because fresh wire is present in the wire web at the beginning of the slicing operation, said fresh wire causing a wide slicing gap and thus a reduced slice thickness. The wire stock present in the wire web at the beginning of the slicing operation is that which was last to cut through the saw beam in the preceding slicing operation. The saw beam is composed of a material that is generally softer and easier to machine than the semiconductor material. The saw beam is, for example, composed of sintered carbon, a composite plastic or glass. The cutting through the saw beam therefore leads only to a small amount of wear of the wire present in the wire web at the beginning of the slicing operation. As soon as a cutting depth into the workpiece of a few centimeters has been achieved, in the course of the further feeding of wire and incipient wear of the wire owing to the contact with the workpiece, the wire stock in the wire web is replaced with wire sections whose diameter is determined by the ratio of chip volume to wire feed rate, such that then a thinner slicing gap is produced and a larger slice thickness results.

In the region of the greatest length of engagement of the wire into the workpiece, that is to say in the center of the scan line 58, the thickness of the wire-lap-sliced semiconductor slice 60 has a saddle shape 57. This is due to the fact that the wire sections, during the entry into the workpiece and during the further penetration in the direction of the workpiece center, lose a large part of the cutting aid (slurry) surrounding them, which also determines the width of the slicing gap produced, as a result of said cutting aid being wiped off on the workpiece edge, being used up and dripping off. FIG. 10 shows two such zones 57 of reduced thickness at edges of the semiconductor slice which are opposite one another in a wire running direction. The wire sections have consequently entered the workpiece in both directions during the sawing in the pilgrim step method.

Figure 9:
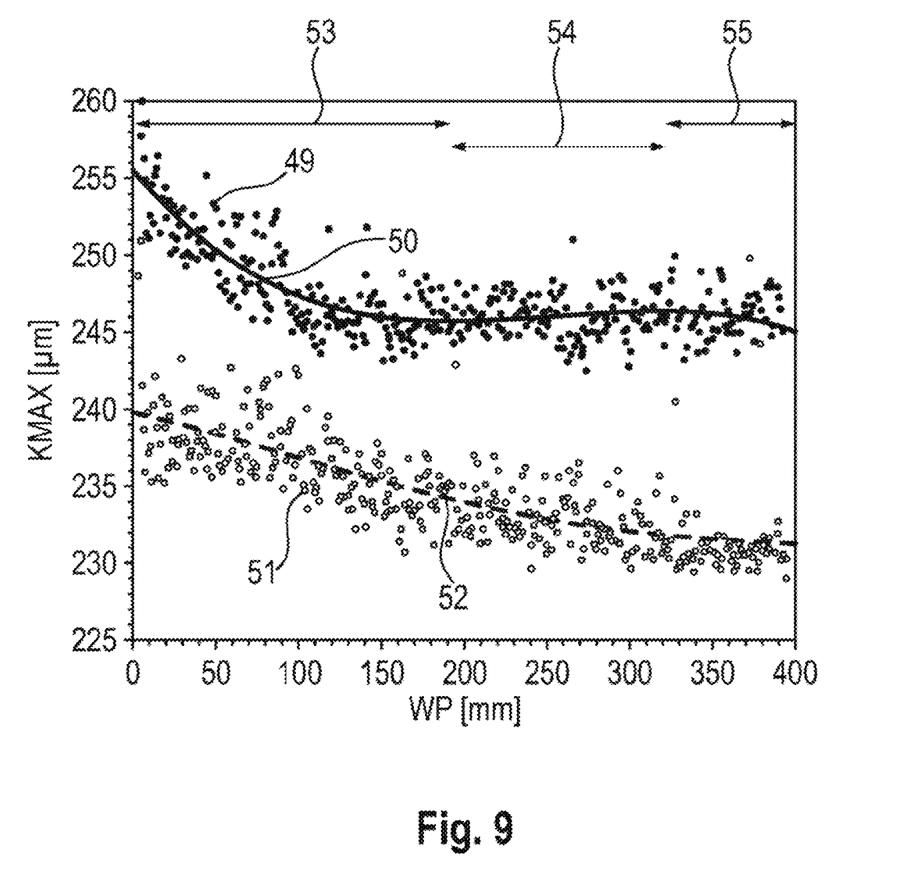
FIG. 9 shows the (+3σ) quantiles of the maximum widths KMAX of the slicing gaps from lap slicing operations using a plain wire and a structured wire.

This behavior and the resulting slice shape shown explain the observed profile of the maximum width of the slicing gap in dependence on the position WP, shown by FIG. 9. The set of points 51 and the associated regression curve 52 show the profile of the (+3σ) quantiles of the maximum width of the slicing gaps from approximately 2000 slicing operations, in which silicon slices (wafers) having a diameter of 300 mm were sliced off using a plain wire. For comparison, the set of points 49 and the associated regression curve show the profile of the (+3σ) quantiles of the maximum width of the slicing gap in dependence on the position WP, where approximately 1000 slicing operations were carried out using structured wire in order to obtain semiconductor slices having a diameter of 300 mm.

The profile of the regression curve 52 shows that when using plain wire, the maximum width of the slicing gap has a non-linear dependence on the position WP and consequently cannot be compensated by a linear degression of the groove pitches so that slices having for example a thickness that is as similar as possible can be obtained from each position WP. The set of points 49 and the profile of the associated regression curve 50 show that when using structured wire, the maximum width of the slicing gap in dependence on the position WP can even increase in certain places. The regression curve 50 has for example a section 53 having non-linearly falling maximum slicing gap widths, furthermore a section 54 in which the maximum slicing gap widths increase with the position WP despite the fact that the effective diameter of the structured wire decreases with the cumulative engagement length into the workpiece, and also a section 55 having a non-linearly falling maximum slicing gap width.

Figure 3:
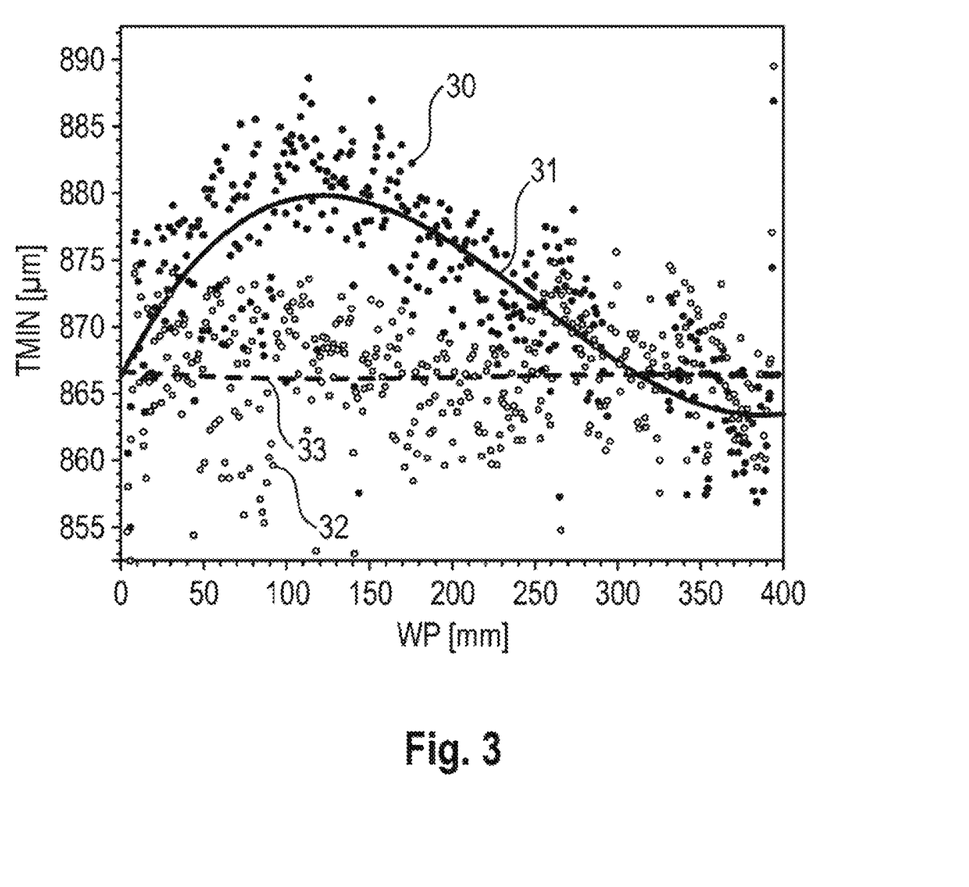
FIG. 3 shows the (−3σ) quantiles of the minimum thicknesses TMIN of a comparative example and of a first example in dependence on the position WP.

FIG. 3 shows, as a comparative example, the set of points 30 of the (−3σ) quantile of the minimum thicknesses TMIN of the semiconductor slices obtained from approximately 1000 slicing operations by means of lap slicing using structured wire with a core wire diameter of 175 μm, plotted against the position WP in the wire web. Wire guide rollers having pitches of adjacent grooves that linearly decrease from the first to the last groove were used and straight circular-cylindrical silicon (100) single crystals were cut, where up to three ingots having a total length of up to 400 mm (variable) were successively mounted on the saw beam in a slicing operation. Only every 25th semiconductor slice was measured, such that in spite of the high number of slicing operations and owing to the (−3σ) quantile which is generally noisy for statistical reasons, the set of points 30 has a considerable spread with third order polynomial regression 31. 60 km of structured wire were used for each slicing operation, which resulted in a difference between the effective diameter of the fresh wire supplied to the wire web and the effective diameter of the used wire taken off from the wire web of 12 µm. The groove pitch between the first and second grooves was 1134 µm and that between the penultimate and last grooves was 1122 µm, the total of the linear degression was consequently 1134 µm–1122=12 µm, such that preferably identical thicknesses TMIN should have resulted for the minimum thickness of the first and last semiconductor slices. However, it was shown that in spite of the linear degression of the groove pitch, the semiconductor slices from intermediate positions deviated from one another by up to 5.7 µm with respect to the regression curve 31, and up to 12.3 µm with respect to the quantiles, according to the set of points 30. Consequently, in spite of the linear degression of the groove pitches, valuable semiconductor material had been wasted as a result of the production of unnecessarily thick semiconductor slices.

Figure 4:
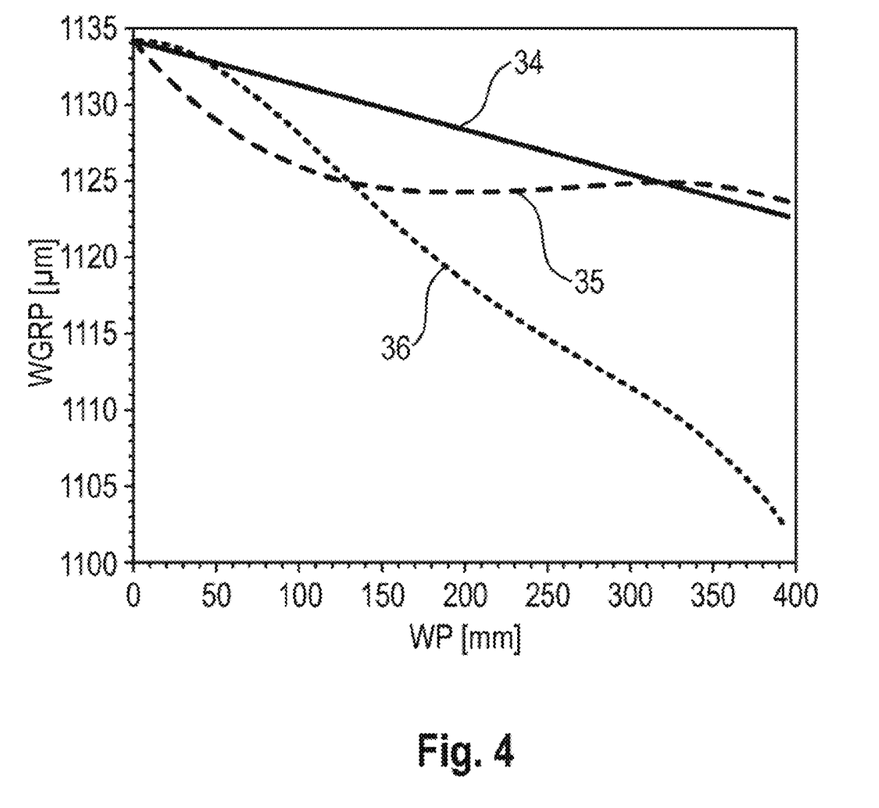
FIG. 4 shows the groove pitches WGRP in dependence on the position WP for the comparative example, the first example and the second example.

FIG. 4 shows the initial distribution of the groove pitches 34 as a pitch function for the comparative example, the first example and the second example. A linear degression of the groove pitch was selected in each case. For the first and second examples, this profile of the groove pitches 34 corresponds to the function dINI(WP), the slicing operations of the comparative example forming the preceding slicing operations. FIG. 4 furthermore shows the profile of the groove pitches 35, which corresponds to the non-linear pitch function dTAR(WP) calculated by means of the equation dTAR(WP)=dINI(WP)+TTAR(WP)−TINI(WP) for the first example. The function TINI(WP) represents the thickness of the (−3σ) quantiles of the minimum thicknesses of the slices of the preceding slicing operations, and the target thickness characteristic value function represents constant (−3σ) quantiles of the minimum thicknesses: TTAR(WP)=878.6 µm. The profile of the groove pitches 35 does not only decrease monotonously, but rather also temporarily has an increasing region. The regions of this profile have a similar structure to the regions 53, 54 and 55 of the regression curve 50 of the (+3σ) quantiles of the maximum slicing gap width as per FIG. 9.

FIG. 3 shows, as the result of the first example, the set of points 32 of the (−3σ) quantile of the minimum thicknesses TMIN from approximately 1000 slicing operations by means of lap slicing, the thickness characteristic value being measured only on every 25th semiconductor slice. With the exception of the groove pitches, the conditions in the lap slicing were the same as those in the comparative example. The groove pitches 35 followed the non-linear pitch function dTAR(WP) calculated by means of the equation. The fitted polynomial 33 with respect to the set of points 32 is virtually constant for all positions WP in the wire web. The method carried out according to the invention thus provided semiconductor slices having (−3σ) quantiles of the minimum thicknesses that are narrowly distributed around their target value of 878.6 µm.

Figure 5:
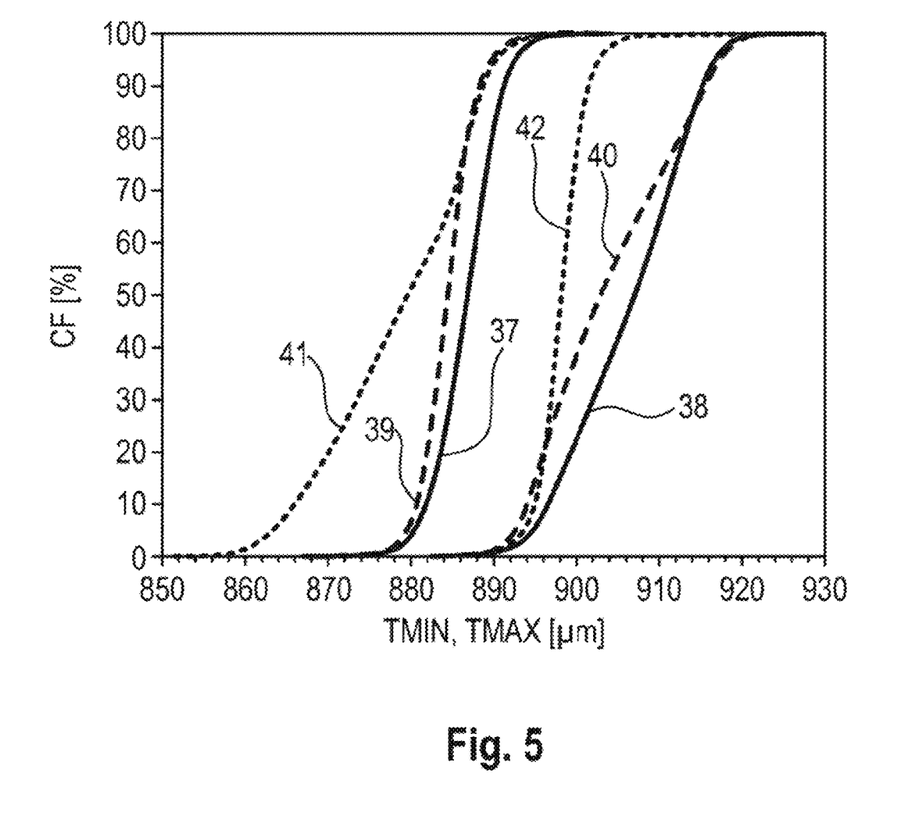
FIG. 5 shows the cumulative frequency CF of the minimum thicknesses TMIN and maximum thicknesses TMAX of the slices from the comparative example, the first example and the second example.

FIG. 5 shows the cumulative frequency of the minimum thicknesses TMIN and maximum thicknesses TMAX of all measured slices, namely the cumulative frequency 37 of the minimum thicknesses of the slices of the comparative example and the cumulative frequency 39 of the minimum thicknesses of the slices of the first example. Likewise plotted are the cumulative frequency 38 of the maximum thicknesses of the slices of the comparative example and the cumulative frequency 40 of the maximum thicknesses of the slices of the first example, and also the cumulative frequency 41 of the minimum thicknesses TMIN and the cumulative frequency 42 of the maximum thicknesses of the slices of the second example.

Figure 6:
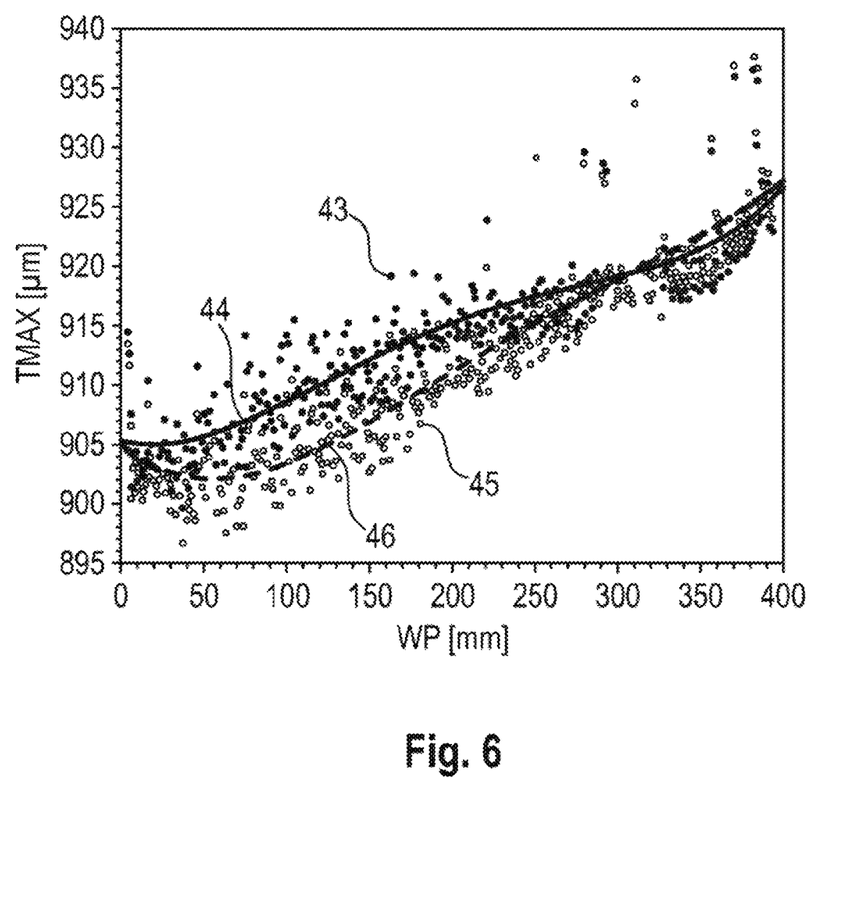
FIG. 6 shows the maximum thicknesses TMAX of the slices associated with the comparative example and with the first example in dependence on the position WP.

FIG. 6 shows the set of points 43 of the (+3σ) quantile of the maximum thicknesses TMAX of the slices of the comparative example and the associated regression curve 44, and also the set of points 45 of the (+3σ) quantile of the maximum thicknesses TMAX of the slices of the first example and the associated regression curve 46.

Figure 7:
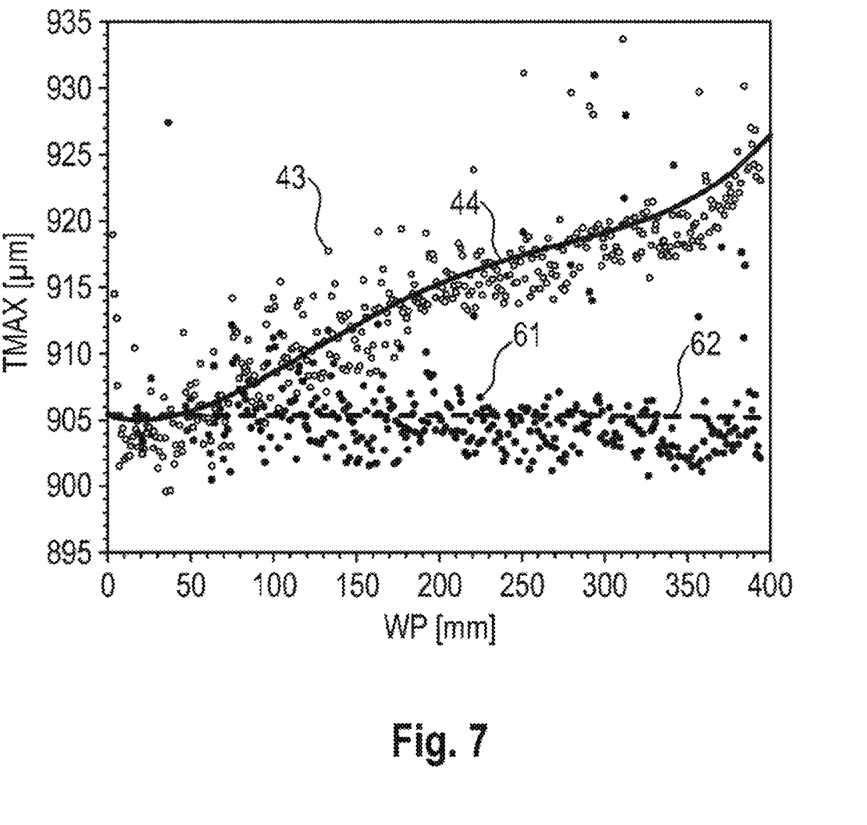
FIG. 7 shows the maximum thicknesses TMAX of the slices from the comparative example and the second example in dependence on the position WP.

The results of the second example show that the groove pitches can for example also be optimized toward a maximum thickness of the slices which is as uniform as possible: FIG. 7 shows the set of points 61 of the (+3σ) quantile of the maximum thicknesses and the associated regression curve 62 of slices in the case of which, during the slicing operation, the groove pitches, like the groove pitches 36 shown in FIG. 4, varied with the position WP in the wire web. The profile corresponds to that of the non-linear pitch function dTAR(WP), wherein, during the solving of the equation, the (+3σ) quantile of the maximum thicknesses was estimated as thickness characteristic value for the thickness characteristic value function TINI(WP) and constant (+3σ) quantiles of the maximum thicknesses were estimated for the target thickness characteristic value function. For comparison, FIG. 7 again shows the set of points 43 of the (+3σ) quantile of the maximum thicknesses of the slices of the comparative example and the associated regression curve 44.

Figure 8:
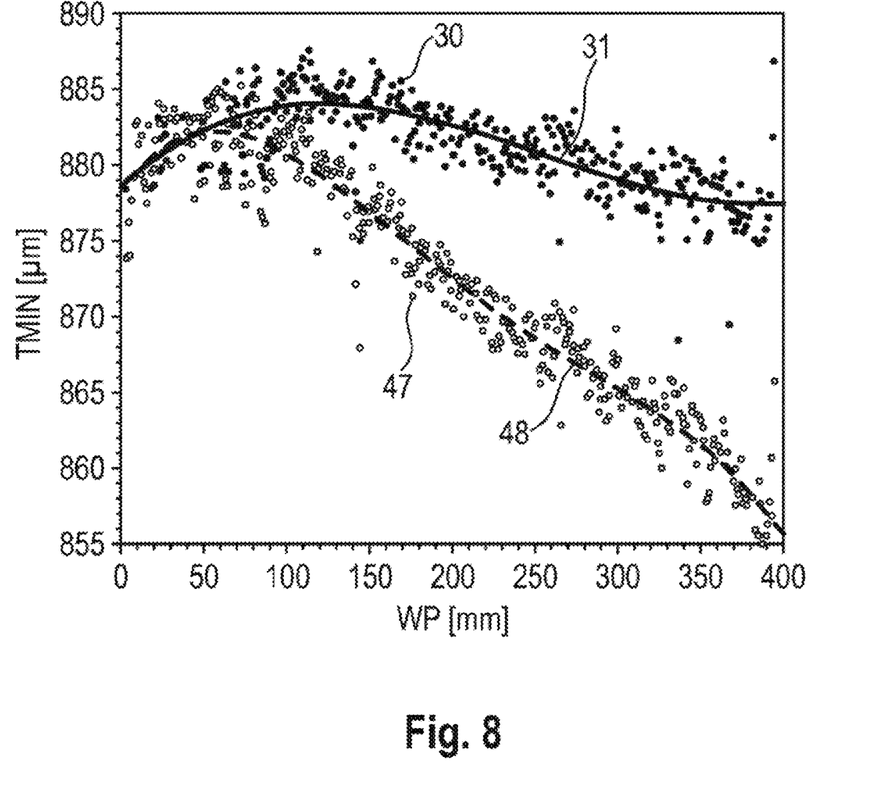
FIG. 8 shows the minimum thicknesses TMIN of the slices associated with the comparative example and the second example in dependence on the position WP.

FIG. 8 shows the set of points 47 of the (−3σ) quantile 47 of the minimum thicknesses of the slices of the second example and the associated regression curve 48, and once again for comparison the set of points 30 of the (−3σ) quantile of the minimum thicknesses of the slices of the comparative example and the associated regression curve 31.

Table 1 summarizes the results:

|  | First example | | | | Second example | | | |
| --- | --- | --- | --- | --- | --- | --- | --- | --- |
|  | TMIN | | TMAX | | TMIN | | TMAX | |
|  | dINI(WP) | dTAR(WP) | dINI(WP) | dTAR(WP) | dINI(WP) | dTAR(WP) | dINI(WP) | dTAR(WP) |
| VAR | 5.2 | 0.0 | 38.3 | 58.6 | 5.2 | 63.5 | 38.3 | 0.0 |
| DIFF | | 5.2 | | −20.4 | | −58.4 | | 38.3 |

Table 1 indicates the variance VAR of the fitted polynomials on which the regression curves are based, and the difference DIFF over the position WP in the wire web by which the thickness distributions of the two examples have changed in relation to the comparative example. In the first example (the target thickness characteristic value function prescribes a constant (−3σ) quantile of the minimum thicknesses TMIN of the slices), the variance in the comparative example (linear degression of the groove pitches) has reduced from 5.2 µm to 0 µm. The variance of the (+3σ) quantiles of the associated maximum thicknesses TMAX of the slices has by contrast increased from 38.3 µm to 58.6 µm. In the second example (the target thickness characteristic value function prescribes a constant (+3σ) quantile of the maximum thicknesses TMAX of the slices), the variance of the (+3σ) quantiles of the maximum thicknesses TMAX of the slices has reduced from 38.3 µm to 0 µm and, by contrast, the variance of the associated (−3σ) quantiles of the minimum thicknesses TMIN has increased from 5.2 µm to 63.5 µm.

The above description of illustrative embodiments is to be understood as being exemplary. The disclosure made thereby enables a person skilled in the art, on the one hand, to understand the present invention and the advantages associated therewith and also comprises, on the other hand, alterations and modifications to the described structures and methods that are also obvious within the understanding of a person skilled in the art. All such alterations and modifications and also equivalents shall therefore be covered by the scope of protection of the claims.

The invention claimed is:

1. A method for improving a thickness uniformity of slices obtained by simultaneously slicing a multiplicity of slices from a workpiece having a workpiece axis with a wire saw, comprising:
   moving wire of the wire saw relative to the workpiece by rotation of wire guide rollers of the wire saw about their axes, the wire guide rollers having a casing which is provided with wire-guiding grooves, and stretched between the wire guide rollers, a wire web composed of wire sections of the wire;
   feeding the workpiece to the wire sections of the wire web in the presence of abrasives, the wire sections sawing completely through the workpiece, wherein
   a non-linear pitch function dTAR(WP) is selected in dependence on a target thickness characteristic value function TTAR(WP), a pitch function dINI(WP) and a thickness characteristic value function TINI(WP), the dTAR(WP) function assigning a pitch of adjacent grooves in the casing of the wire guide rollers at a position WP during the slicing operation, TINI(WP) assigning a characteristic value measured on the slices of which are obtained during one or more preceding slicing operations by the wire saw at the position WP, the dINI(WP) assigning a pitch to adjacent grooves in the casing of the wire guide rollers at the position WP during the preceding slicing operations, TTAR(WP) assigning a target thickness characteristic value to slices which are sliced off during the slicing operation at the position WP, wherein WP denotes the axial position of adjacent grooves with respect to the axes of the wire guide rollers.

2. The method of claim 1, wherein a plurality of preceding slicing operations are carried out and the pitch dTAR(WP) is selected such that the equation dTAR(WP)=dINI(WP)+TTAR(WP)−TINI(WP) is satisfied.

3. The method of claim 1, wherein the measured thickness characteristic value is the mean value of the minimum thickness, the mean value of the maximum thickness, the mean value of the average thickness or the thickness of a quantile of the minimum thickness, of the maximum thickness or of the average thickness of the measured slices.

4. The method of claim 1, wherein TTAR(WP) is a constant.

5. The method of claim 1, wherein the wire is a smooth piano wire composed of hypereutectoid pearlite and abrasives are provided in the form of a slurry composed of silicon carbide (SiC) in a carrier fluid comprising glycol or oil.

6. The method of claim 4, wherein the wire is additionally provided with a multiplicity of protrusions and indentations perpendicular to the longitudinal direction of the wire.

7. The method of claim 1, wherein moving of the wire comprises a continuous sequence of pairs of directional reversals, and a pair of directional reversals comprising in each case a first moving of the wire in a first direction in a wire longitudinal direction by a first length and a subsequent moving of the wire in a second direction, exactly opposite to the first direction, by a second length, and the first length being selected to be greater than the second length.

8. The method of claim 1, wherein the workpiece axis is oriented parallel to the axes of the wire guide rollers.

9. The method of claim 1, wherein the grooves have a depth which follows a depth function t(WP), which assigns the grooves at the position WP a depth proportional to the envelope of the wire.

10. A wire saw for simultaneously slicing a multiplicity of slices from a workpiece, comprising wire guide rollers which stretch a wire web and have axes and casings, the casings being provided with a multiplicity of grooves that guide wire of the wire web, the pitch between adjacent grooves at a position WP defined by a non-linear pitch function dTAR(WP) where WP denotes the axial position of the adjacent grooves with respect to the axes of the wire guide rollers and the non-linear pitch function dTAR(WP) being selected such that the equation dTAR(WP)=dINI(WP)+TTAR(WP)−TINI(WP) is satisfied, wherein TTAR(WP) is a target thickness characteristic value function assigned to slices to be sliced off at the position WP, a target thickness characteristic value TINI(WP) being a thickness characteristic value function assigned to slices which have been obtained during a plurality of preceding slicing operations by means of the wire saw at the position WP, a thickness characteristic value dINI(WP) measured on the slices, being a pitch function which assigns to adjacent grooves in the casing of the wire guide rollers at the position WP a pitch which was present during the preceding slicing operations.

11. The wire saw of claim 10, wherein the measured thickness characteristic value is the mean value of the minimum thickness, the mean value of the maximum thickness, the mean value of the average thickness or the thickness of a quantile of the minimum thickness, of the maximum thickness or of the average thickness of the measured slices.

* * * * *